(12) United States Patent
Venkataraman et al.

(10) Patent No.: US 10,664,520 B2
(45) Date of Patent: May 26, 2020

(54) PERSONALIZED MEDIA PRESENTATION TEMPLATES

(71) Applicant: Apple Inc., Cupertino, CA (US)

(72) Inventors: Chandrasekar Venkataraman, Palo Alto, CA (US); Taylor G. Carrigan, San Francisco, CA (US); Thomas Alsina, Mountain View, CA (US); Venkat Sundaranatha, San Jose, CA (US); Jayasimha R. Katukuri, San Jose, CA (US); Simon C. Janpanah, Los Angeles, CA (US); Rabi S. Chakraborty, San Jose, CA (US); Thomas S. Plagenhoef, Los Angeles, CA (US); Drew R. Domm, Oakland, CA (US); Mark Hilary Levy, Winchester (GB)

(73) Assignee: APPLE INC., Cupertino, CA (US)

( * ) Notice: Subject to any disclaimer, the term of this patent is extended or adjusted under 35 U.S.C. 154(b) by 724 days.

(21) Appl. No.: 14/855,019

(22) Filed: Sep. 15, 2015

(65) Prior Publication Data
US 2016/0357864 A1 Dec. 8, 2016

Related U.S. Application Data

(60) Provisional application No. 62/171,869, filed on Jun. 5, 2015.

(51) Int. Cl.
*G06F 16/638* (2019.01)
*G06F 16/29* (2019.01)
(Continued)

(52) U.S. Cl.
CPC ............ *G06F 16/639* (2019.01); *G06F 16/29* (2019.01); *G06F 16/68* (2019.01); *G06F 16/9535* (2019.01); *G06Q 30/0631* (2013.01)

(58) Field of Classification Search
None
See application file for complete search history.

(56) References Cited

U.S. PATENT DOCUMENTS

| 8,121,902 B1* | 2/2012 | Desjardins ......... G06Q 30/0601 705/26.1 |
| 9,678,637 B1* | 6/2017 | Brothers ............... G06F 3/0484 |

(Continued)

*Primary Examiner* — Richard L Bowen
(74) *Attorney, Agent, or Firm* — Fernando & Partners, LLP

(57) ABSTRACT

The techniques utilize a user's recommendation data to choose a presentation template. Each presentation template includes a plurality of media asset slots, each of which is associated with a certain type of media asset. For example, each media asset slot generally may be assigned to a playlist, album, composer, or music video. Further, each of these general assignments may further specify that the playlist, album, composer, or music video be from a known artist, familiar artist, recommended artist, or unknown artist, for example. Once the appropriate presentation template has been chosen along with the recommended media content for each of the plurality of media asset slots, the media asset slots are associated with the selected media content. The presentation template is then utilized to generate a graphical user interface that may be delivered to the display of an electronic device for presentation to a user, where the order in which the recommended media content is presented via the graphical user interface corresponds to the order of the media asset slots of the chosen presentation template.

35 Claims, 15 Drawing Sheets

(51) Int. Cl.
*G06F 16/68* (2019.01)
*G06F 16/9535* (2019.01)
*G06Q 30/06* (2012.01)

(56) References Cited

U.S. PATENT DOCUMENTS

| | | | | |
|---|---|---|---|---|
| 9,712,587 | B1* | 7/2017 | Alfishawi | G06Q 30/0269 |
| 9,904,949 | B1* | 2/2018 | Tavernier | G06Q 30/0631 |
| 2006/0143236 | A1* | 6/2006 | Wu | G06F 17/30053 |
| 2009/0150797 | A1* | 6/2009 | Burkholder | G06F 17/30056 |
| | | | | 715/747 |
| 2010/0023863 | A1* | 1/2010 | Cohen-Martin | G06Q 30/02 |
| | | | | 715/723 |
| 2010/0198812 | A1* | 8/2010 | Athsani | H04W 4/029 |
| | | | | 707/722 |
| 2011/0047577 | A1* | 2/2011 | Modi | H04N 5/782 |
| | | | | 725/47 |
| 2011/0154197 | A1* | 6/2011 | Hawthorne | G06F 17/3002 |
| | | | | 715/704 |
| 2012/0084666 | A1* | 4/2012 | Hickman | G06Q 30/02 |
| | | | | 715/751 |
| 2013/0080427 | A1* | 3/2013 | Cross | G06Q 30/0224 |
| | | | | 707/728 |
| 2013/0145385 | A1* | 6/2013 | Aghajanyan | G06Q 30/02 |
| | | | | 725/10 |
| 2013/0293496 | A1* | 11/2013 | Takamoto | G06F 3/0482 |
| | | | | 345/173 |
| 2014/0013212 | A1* | 1/2014 | Von Haden | G06F 17/248 |
| | | | | 715/243 |
| 2014/0180762 | A1* | 6/2014 | Gilbert | G06Q 30/02 |
| | | | | 705/7.29 |
| 2014/0288680 | A1* | 9/2014 | Hoffman | G06K 9/00342 |
| | | | | 700/91 |
| 2015/0113399 | A1* | 4/2015 | Bilinski | G06F 3/0482 |
| | | | | 715/716 |
| 2015/0143409 | A1* | 5/2015 | Maughan | H04N 21/262 |
| | | | | 725/34 |
| 2015/0154647 | A1* | 6/2015 | Suwald | G06Q 30/0269 |
| | | | | 705/14.66 |
| 2015/0269152 | A1* | 9/2015 | Rekhi | G06F 17/3053 |
| | | | | 707/748 |
| 2016/0092159 | A1* | 3/2016 | Chen | G06F 3/165 |
| | | | | 700/94 |
| 2016/0125498 | A1* | 5/2016 | Setty | G06F 16/23 |
| | | | | 705/26.63 |

\* cited by examiner

TEMPLATE: DEFAULT → 60B₁

| | I | II | III |
|---|---|---|---|
| 62A | 1 | MULTI-ARTIST PLAYLIST | ANY PLAYLIST | |
| 62B | 2 | SINGLE-ARTIST PLAYLIST | ANY PLAYLIST | |
| 62C | 3 | ANY PLAYLIST | | |
| 62D | 4 | ALBUM BY KNOWN ARTIST | ALBUM BY FAMILIAR ARTIST | ANY ALBUM |
| 62E | 5 | ALBUM BY KNOWN ARTIST | ALBUM BY FAMILIAR ARTIST | ANY ALBUM |
| 62F | 6 | ALBUM BY FAMILIAR ARTIST | ALBUM BY RECOMMENDED ARTIST | ANY ALBUM |
| 62G | 7 | ALBUM BY FAMILIAR ARTIST | ALBUM BY RECOMMENDED ARTIST | ANY ALBUM |
| 62H | 8 | ALBUM BY RECOMMENDED ARTIST | ALBUM BY FAMILIAR ARTIST | ANY ALBUM |
| 62I | 9 | ALBUM BY RECOMMENDED ARTIST | ALBUM BY FAMILIAR ARTIST | ANY ALBUM |

*FIG. 16*

TEMPLATE: DISCOVERY → 60B₂

| | I | II | III |
|---|---|---|---|
| 62A | 1 | MULTI-ARTIST PLAYLIST | ANY PLAYLIST | |
| 62B | 2 | SINGLE-ARTIST PLAYLIST | ANY PLAYLIST | |
| 62C | 3 | ANY PLAYLIST | | |
| 62D | 4 | ALBUM BY FAMILIAR ARTIST | ALBUM BY RECOMMENDED ARTIST | ANY ALBUM |
| 62E | 5 | ALBUM BY RECOMMENDED ARTIST | ALBUM BY FAMILIAR ARTIST | ANY ALBUM |
| 62F | 6 | ALBUM BY KNOWN ARTIST | ALBUM BY FAMILIAR ARTIST | ANY ALBUM |
| 62G | 7 | ALBUM BY KNOWN ARTIST | ALBUM BY FAMILIAR ARTIST | ANY ALBUM |
| 62H | 8 | ALBUM BY RECOMMENDED ARTIST | ALBUM BY FAMILIAR ARTIST | ANY ALBUM |
| 62I | 9 | ALBUM BY RECOMMENDED ARTIST | ALBUM BY FAMILIAR ARTIST | ANY ALBUM |

*FIG. 17*

TEMPLATE: RAINY DAY

| | I | II | III |
|---|---|---|---|
| 62A | 1 | TOP NEW CHART PLAYLIST | MIXED-ARTIST PLAYLIST | ANY ALBUM |
| 62B | 2 | FEATURED ARTIST PLAYLIST | ANY PLAYLIST | |
| 62C | 3 | ANY PLAYLIST | | |
| 62D | 4 | DOWNBEAT ALBUM | ALBUM BY KNOWN ARTIST | ANY ALBUM |
| 62E | 5 | DOWNBEAT ALBUM | ALBUM BY KNOWN ARTIST | ANY ALBUM |
| 62F | 6 | RECENT RELEASE ALBUM | ALBUM BY KNOWN ARTIST | ANY ALBUM |
| 62G | 7 | ALBUM BY RECOMMENDED ARTIST | ALBUM BY FAMILIAR ARTIST | ANY ALBUM |
| 62H | 8 | RECENT RELEASE ALBUM | ALBUM BY FAMILIAR ARTIST | ANY ALBUM |
| 62I | 9 | ALBUM BY KNOWN ARTIST | ALBUM BY RECOMMENDED ARTIST | ANY ALBUM |

TEMPLATE: PLAYLIST INTENSIVE

| | I | II | III |
|---|---|---|---|
| 62A | 1 | TOP GENRE PLAYLIST | MIXED-ARTIST PLAYLIST | ANY ALBUM |
| 62B | 2 | MIXED-ARTIST PLAYLIST | ANY PLAYLIST | |
| 62C | 3 | SINGLE-ARTIST PLAYLIST | ANY PLAYLIST | |
| 62D | 4 | TOP NEW CHART PLAYLIST | ANY PLAYLIST | |
| 62E | 5 | MIXED-ARTIST PLAYLIST | | |
| 62F | 6 | ALBUM BY KNOWN ARTIST | ALBUM BY FAMILIAR ARTIST | ANY ALBUM |
| 62G | 7 | ALBUM BY KNOWN ARTIST | ALBUM BY FAMILIAR ARTIST | ANY ALBUM |
| 62H | 8 | ALBUM BY RECOMMENDED ARTIST | ALBUM BY FAMILIAR ARTIST | ANY ALBUM |
| 62I | 9 | ALBUM BY RECOMMENDED ARTIST | ALBUM BY FAMILIAR ARTIST | ANY ALBUM |

TEMPLATE: CLASSICAL MUSIC

| | I | II | III |
|---|---|---|---|
| 1 | MULTI-ARTIST PLAYLIST | ANY PLAYLIST | |
| 2 | SINGLE-ARTIST PLAYLIST | ANY PLAYLIST | |
| 3 | ANY PLAYLIST | | |
| 4 | ALBUM BY KNOWN COMPOSER | ALBUM BY REC. COMPOSER | ANY ALBUM |
| 5 | ALBUM BY REC. COMPOSER | ALBUM BY KNOWN COMPOSER | ANY ALBUM |
| 6 | ALBUM BY KNOWN ARTIST | ALBUM BY FAMILIAR ARTIST | ANY ALBUM |
| 7 | ALBUM BY FAMILIAR ARTIST | ALBUM BY RECOMMENDED ARTIST | ANY ALBUM |
| 8 | ALBUM BY RECOMMENDED ARTIST | ALBUM BY FAMILIAR ARTIST | ANY ALBUM |
| 9 | ALBUM BY KNOWN COMPOSER | ALBUM BY REC. COMPOSER | ANY ALBUM |

FIG. 20

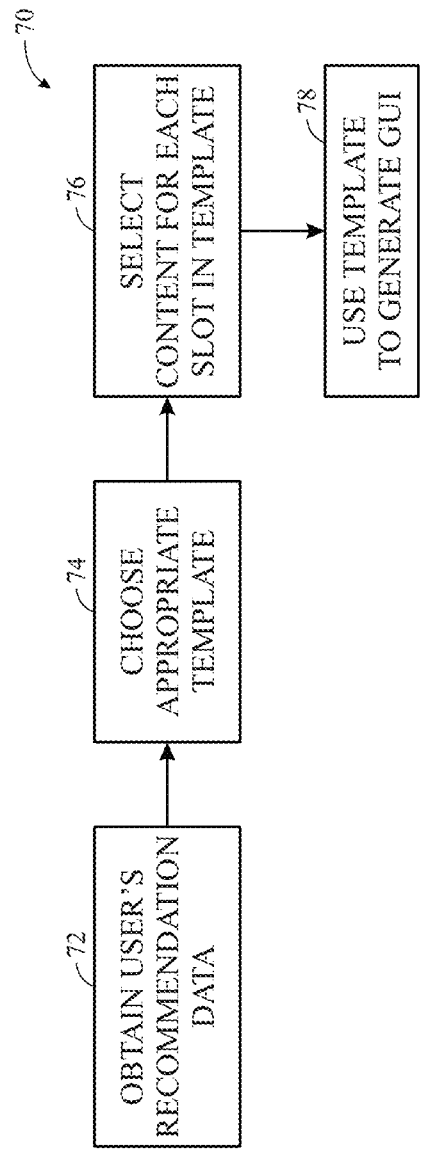

FIG. 21

PERSONALIZED MEDIA PRESENTATION TEMPLATES

CROSS REFERENCE TO RELATED APPLICATIONS

This application is a Non-Provisional application claiming priority to U.S. Provisional Patent Application No. 62/171,869, entitled "Personalized Music Presentation Templates", filed Jun. 5, 2015, which is herein incorporated by reference.

BACKGROUND

The present disclosure relates generally to data-driven recommendations and, more particularly, to techniques for presenting recommended media content to a user.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Recommendation systems have become increasingly more popular in recent years. Such systems are used to make recommendations to users for a wide variety of purposes. For example, recommendation systems may be used to provide recommendations for various types of media content, such as movies, music, or books. Recommendation systems may also be used to provide assistance when a user is typing a search query or text message, looking for a restaurant or hotel, or searching for the right match on an online dating site.

Regardless of its purpose, most recommendation systems are typically intended to narrow choices to help a user quickly find the best choice that meets that user's needs. The better a recommendation system is at providing choices that please the user, the more likely that the user will continue to use the service. This benefits the user because the user perceives that they are receiving more personalized service and, thus, experience a higher satisfaction level with the service. It also benefits the service provider since a satisfied user is more likely to purchase more products and services and remain loyal to the service provider.

To provide the most personalized service to a particular user, recommendation systems typically gather a great deal of data about each particular user and use that data to provide recommendations to best fit each user's needs. Recommendation systems typically use the data to produce a list of recommendations using collaborative filtering, content based filtering, or a hybrid of those two. Collaborative filtering techniques typically build a statistical model from a user's past behavior, and possibly similar decisions made by other users, and then use that model to rank items that might be of interest to the user. Higher ranked items have the most statistical likelihood of being interesting to the user. Content based filtering, on the other hand, typically focuses on specific characteristics of one or more items that a user has selected in the past to recommend additional items that have similar properties. Hybrid systems typically combine techniques from both of these approaches to find appropriate recommendations for a user.

Of all the different types of recommendation systems, there is possibly none more personal than music recommendation system. Each person's taste in music is uniquely personal. Some people have very narrow tastes in music, and may listen to primarily only a single genre such as 50's rock or modern country. On the other hand, other people may have a very wide array of music they enjoy listening to . . . everything from classical music to hip-hop to country to alternative rock to heavy metal to Top 40. Furthermore, people listen to music for various reasons. For example, music can help wake you up, calm you down, help you exercise, motivate you, or put you in a certain mood.

Because the selection of music is such a complex and personal experience, music recommendation systems typically utilize fairly complicated algorithms that are designed to recommend music that is believed to be best suited to a particular user's taste. These algorithms may make suggestions based on genre, artist, or song similarity, acoustical analysis, as well as a user's particular activity, such as favorite songs, skipped songs, user ratings, and other songs in a user's playlist.

The goal of these music recommendation systems is to provide recommendations that will be selected by the user to enhance the user's experience. However, despite all of the time and effort that has been spent developing these algorithms to provide music recommendations, relatively little effort has been spent in developing techniques in presenting these recommendations to a user. The techniques described below better tailor the presentation of recommended music, or other media content, to a particular user to improve the user's experience and improve the likelihood that the user will select the recommended music.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one disclosed embodiment, there is provided a method for recommending media content that includes obtaining a user's recommendation data, choosing a presentation template having a plurality of media asset slots based at least in part on the user's recommendation data, and associating the media asset slots with recommendations based at least in part on the user's recommendation data, wherein the plurality of media asset slots are organized in a manner that corresponds to an order in which the recommendations are presented to a user when the presentation template is utilized to generate a graphical user interface.

BRIEF DESCRIPTION OF THE DRAWINGS

Various aspects of this disclosure may be better understood upon reading the following detailed description and upon reference to the drawings in which:

FIG. 16 illustrates possible types of media content that may be assigned to media slots for a default template;

FIG. 17 depicts an example of possible types of media content that may be assigned to media asset slots for a discovery template;

FIG. 18 depicts an example of possible types of media content that may be assigned to media asset slots for a rainy day template;

FIG. 19 depicts an example of possible types of media content that may be assigned to media asset slots for a playlist intensive template;

FIG. 20 depicts an example of possible types of media content that may be assigned to media asset slots for classical music template;

FIG. 21 is a flowchart illustrating a technique for recommending media content;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, the present system includes a recommendation system that may be embodied in a cloud computing service, for example. The recommendation system stores media content and collects data that may be useful in determining what media content might be suitable to recommend to the users of a media service, such as a subscription music service. The recommendation system stores a plurality of presentation templates that facilitate the selection and presentation of recommended media content to a user. The presentation templates include media asset slots that may relate to various types of media content. The recommendation system utilizes the collected data to select a presentation template that may be best suited for a particular user. Once all of the media asset slots of the chosen presentation template are associated with the recommended media content, the presentation template is utilized to generate a graphical user interface (GUI) that may be displayed on the user's device to present the recommendations to the user.

Figure 1:
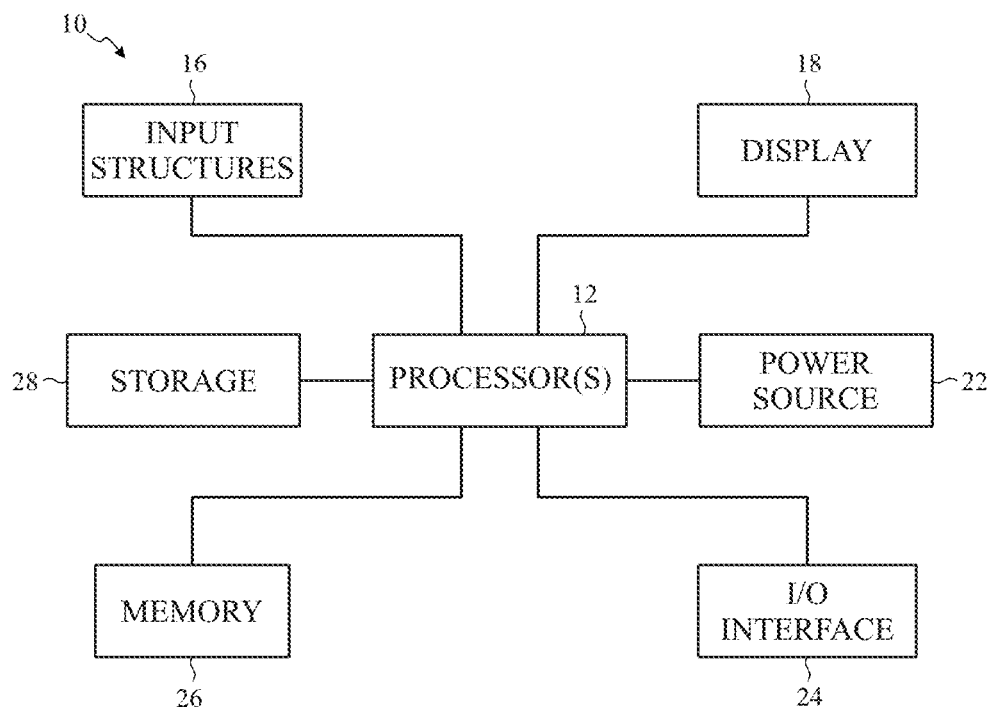
FIG. 1 is a schematic block diagram of an electronic device including display control circuitry, in accordance with an embodiment.

With these features in mind, the following presents a general description of a cloud computing system that may embody the recommendation system, as well as suitable electronic devices that may interface with the recommendation system to present recommended media content to a user. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24 and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
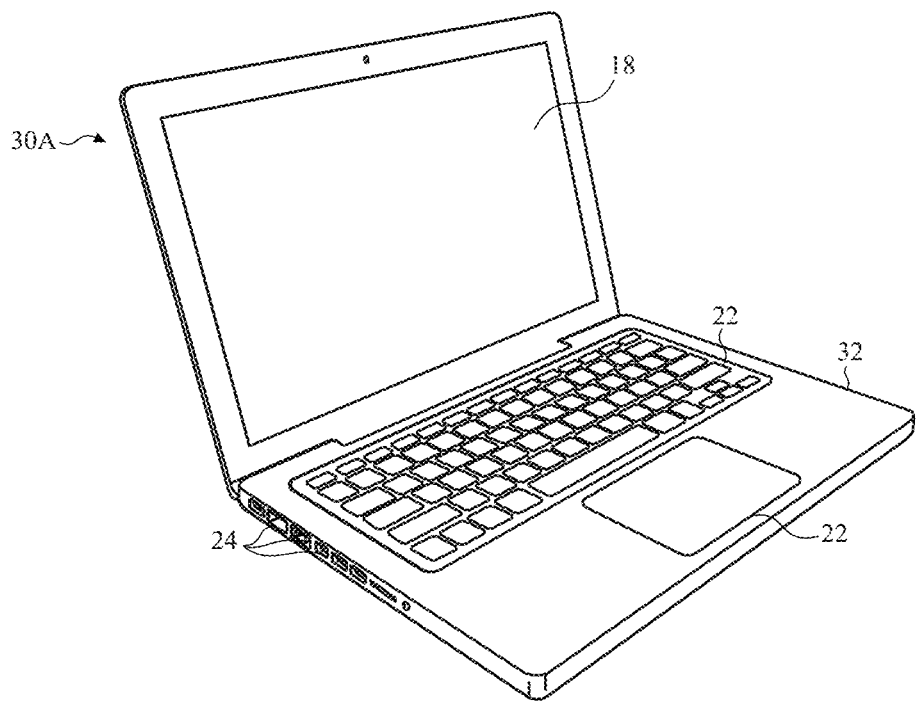
FIG. 2 is a perspective view of a notebook computer representing an embodiment of the electronic device of FIG. 1, in accordance with an embodiment.
Figure 3:
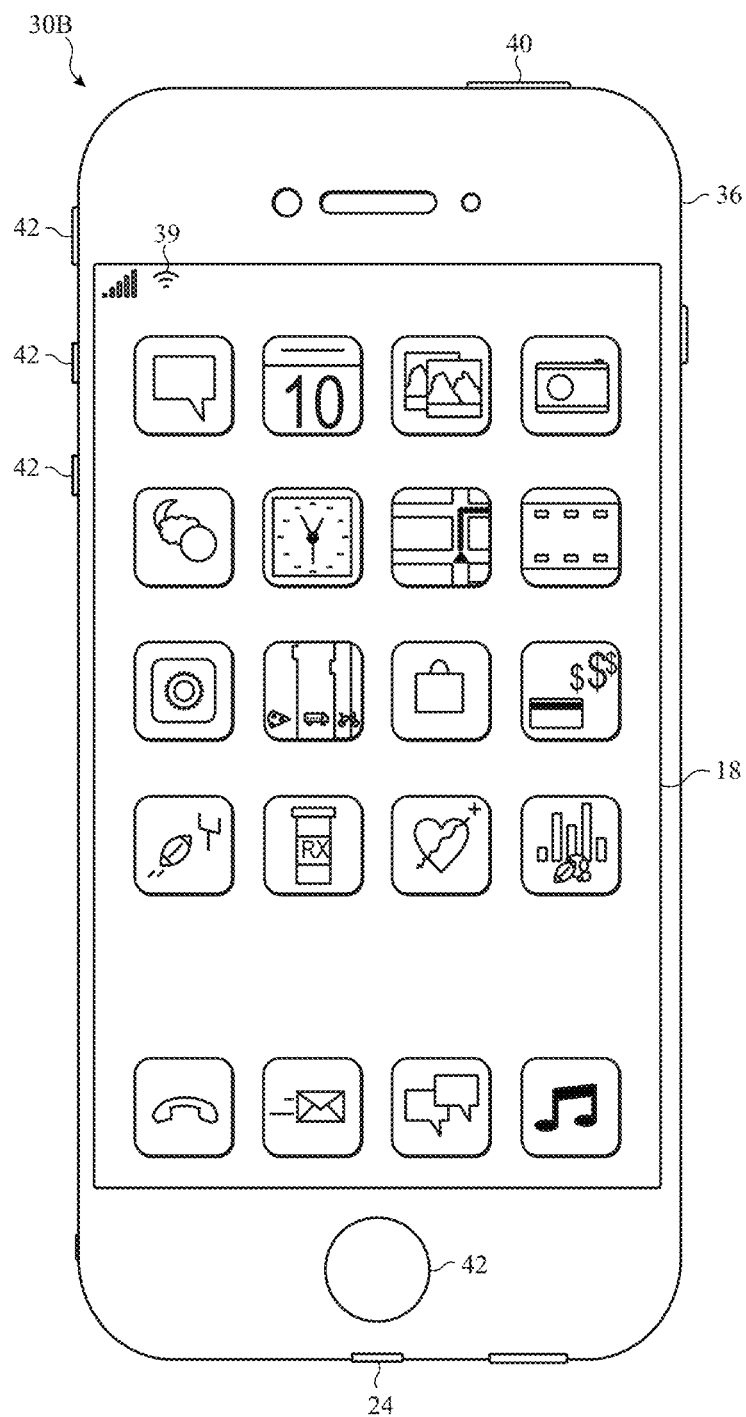
FIG. 3 is a front view of a hand-held device representing another embodiment of the electronic device of FIG. 1, in accordance with an embodiment.
Figure 4:
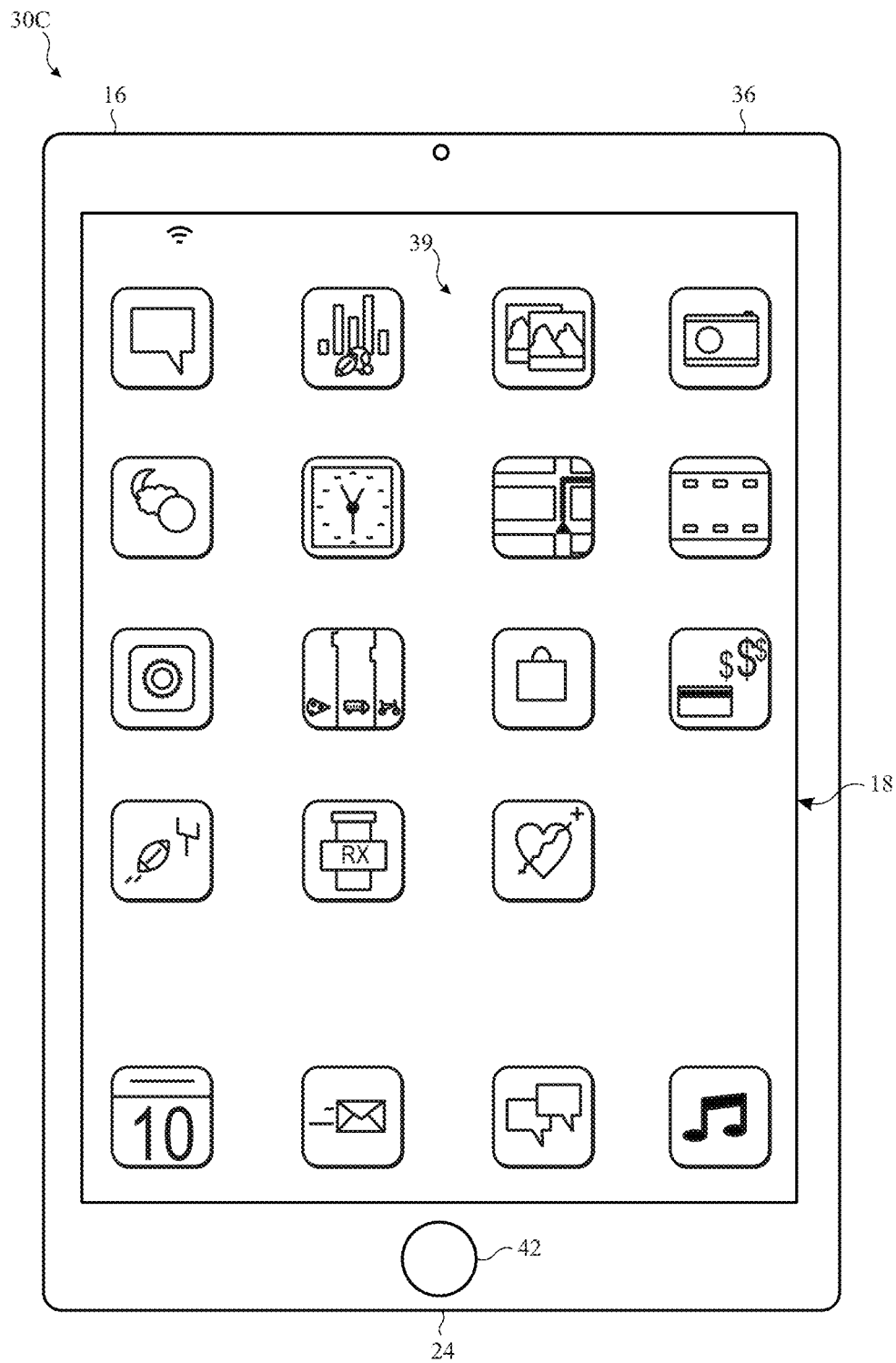
FIG. 4 is a front view of another hand-held device representing another embodiment of the electronic device of FIG. 1, in accordance with an embodiment.
Figure 5:
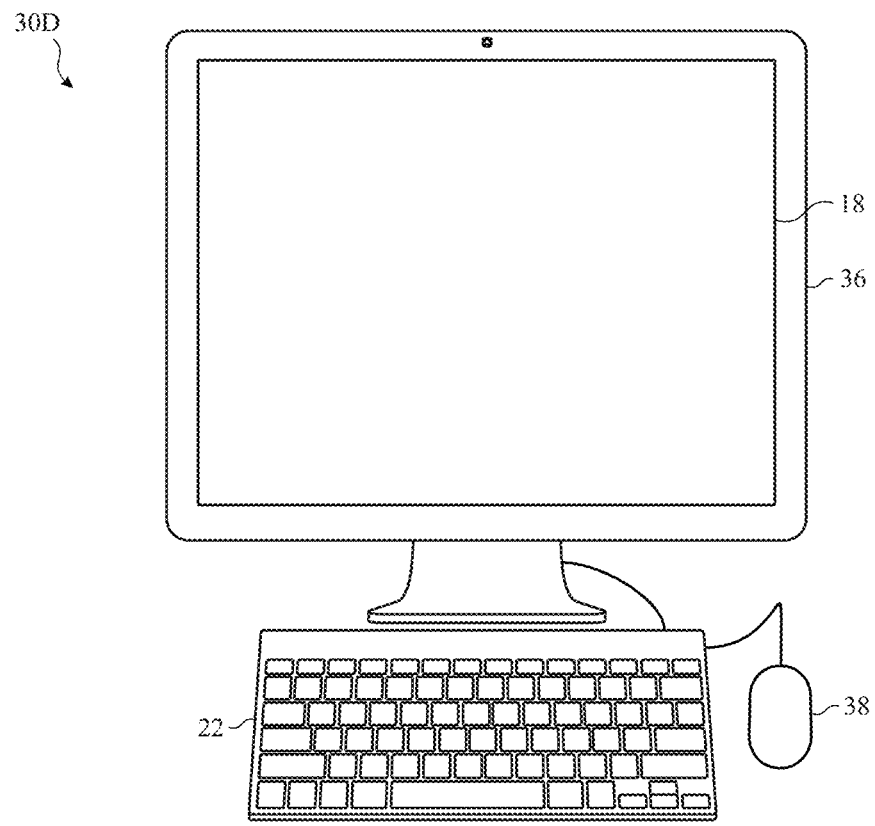
FIG. 5 is a front view of a desktop computer representing another embodiment of the electronic device of FIG. 1, in accordance with an embodiment.
Figure 6:
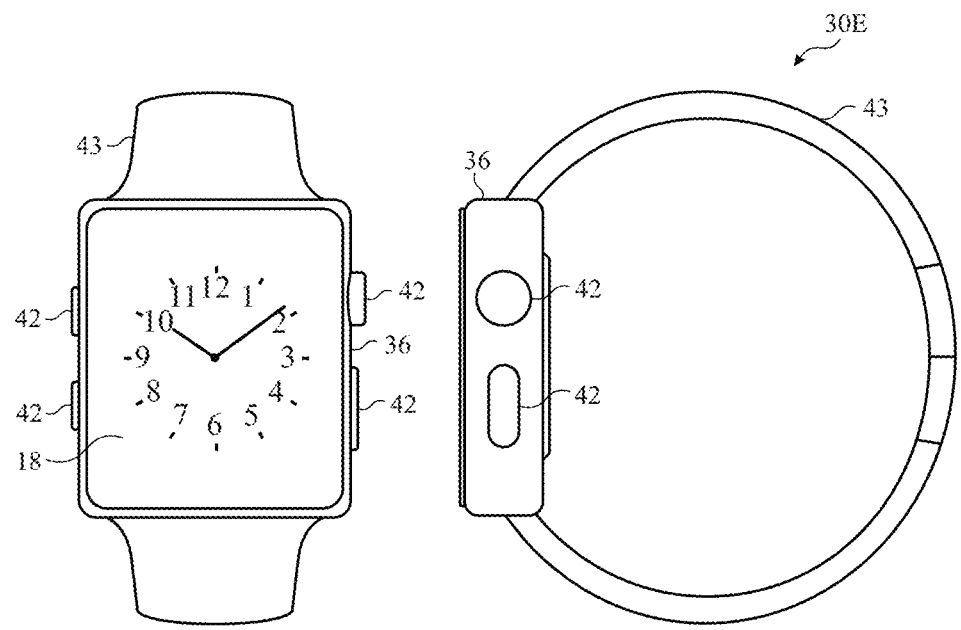
FIG. 6 is a front view of a wearable electronic device representing another embodiment of the electronic device of FIG. 1, in accordance with an embodiment.
Figure 7:
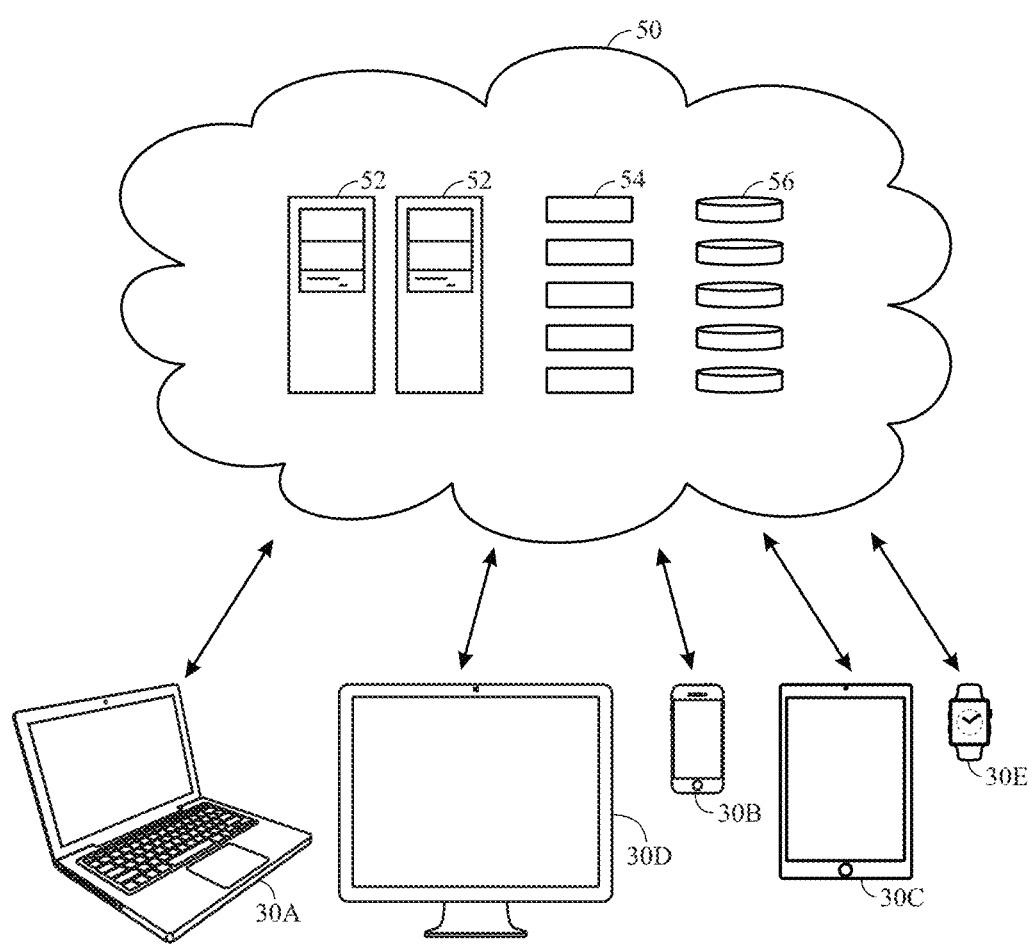
FIG. 7 is a diagram depicting a plurality of electronic devices communicating with a cloud computing service.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices. The I/O interface 24 may include various types of ports that may be connected to cabling. These ports may include standardized and/or proprietary ports, such as USB, RS232, Apple's Lightning® connector, as well as one or more ports for a conducted RF link. The I/O interface 24 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include housing or enclosure 32, a display 18, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 38 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, OLED display, active-matrix organic light emitting diode (e.g., AMOLED) display, and so forth), which may allow users to interact with a user interface of the wearable electronic device 30E.

The electronic device 10, such as the various devices 30A, 30B, 30C, 30D, and 30E, discussed above, may be capable of communicating with a cloud computing service 50. The cloud computing 50 may include, among other things, servers 52, data storage 54, and various databases 56. The servers 52, data storage 54, and databases 56 may be centrally located or they may be geographically distributed. Similarly, the servers 52, storage 54, and databases 56 may be owned by a single entity, or these various elements of the cloud computing service 50 may be owned by various entities.

The cloud computing service 50 may embody, among other things, a recommendation system in accordance with the present techniques as described in detail below. For example, the software algorithms associated with the recommendation system may be stored on the data storage 54, so that the servers 52 can access and execute the instructions. Similarly, the database 56 may include a wide variety of media content, such as music, music videos, albums, playlists, etc., which similarly may be accessible by the servers 52. Furthermore, data related to a user of the recommendation system, such as user taste profiles, user historical information, user libraries, user locations, and/or user activities, may be stored in the data storage 54 and/or the databases 56. Indeed, other information that may be used to produce user recommendation data, such as time of day, day of the week, local weather, etc., may also be stored on the data storage 54 and/or the databases 56.

To facilitate the presentation of media recommendations to the user, the recommendation system may store in the data storage 54 a plurality of presentation templates, such as the presentation templates 60A, 60B, 60C, 60D, 60E, 60F, 60G, 60H illustrated in FIGS. 8-15 respectively. Each of the presentation templates 60 include a plurality of media asset slots 62, where each media asset slot 62 is related to certain type of media content and the arrangement of the media asset slots 62 represent a presentation order. Each presentation template 60 may have the media assets slot 62 and their respective content arranged differently so that they may be utilized to generate graphical user interfaces (GUIs) that present the recommended media content to a user in different ways.

In one set of examples, it can be seen that the presentation templates 60A, 60B, 60C, 60D, and 60E illustrated in FIGS. 8-12, respectively, each include nine media asset slots 62A, 62B, 62C, 62D, 62E, 62F, 62G, 62H, and 62I. In this set of examples, the various media asset slots 62 generally relate to a certain type of media content, such as an album, a playlist, or a composer. However, it should be understood that the media asset slots 62 may relate to other types of media content, such as music videos, videos, books, etc. Furthermore, as discussed in detail below with respect to FIGS. 16-20, each of the media asset slots 62 may be related to more specific types of media content, such as albums or playlists by known artists, familiar artists, recommended artists, unknown artists, etc. However, for the purpose of the present discussion of FIGS. 8-12, it should be noticed that the respective media asset slots 62A-62I may be arranged in different combinations on the various presentation templates 60A-60E. Furthermore, although many of the media asset slots 62 in the figures appear to be the same as others, they can actually indicate different levels of visual importance. Hence, the subsequently generated GUI may illustrate certain items more prominently than other items.

Figure 8:
FIG. 8 depicts an example of a first presentation template.

In the presentation template 60A illustrated in FIG. 8, for example, the first two media slots 62A and 62B are each related to albums, the third media asset slot 62C is related to a playlist, the fourth and fifth media asset slots 62D and 62E are related to albums, the sixth media asset slot 62F is related to a playlist, the seventh and eighth media asset slots 62G and 62H are related to albums, and the ninth media asset slot 62I is related to playlist. Thus, when the presentation template 60A is utilized to generate a corresponding GUI, two albums will be sequentially presented to a user, followed by a playlist, followed by two more sequential albums, followed by another playlist, followed by two more sequential albums, and followed by another playlist.

Figure 9:
FIG. 9 depicts an example of a second presentation template.
Figure 10:
FIG. 10 depicts an example of a third presentation template.

While the presentation template 60A provides the user with a mix of albums and playlists in the particular ordered combination shown, some users may be more inclined to listen to playlists than albums. Accordingly, certain presentation templates may be "playlist intensive" in that they provide the user with several sequential playlist recommendations prior to providing other recommendations, or in that they provide the user with more playlist options than other types of recommendations. One such playlist intensive presentation template is illustrated in FIG. 9 as presentation template 60B. In this example, the first three media asset slots 62A, 62B, and 62C are designated to provide three different sequential playlist recommendations, while the remaining six slots 62D-62I are designated to provide six different sequential album recommendations. Another example of a playlist intensive presentation template is illustrated in FIG. 10 as presentation template 60C. In this example, although the first and second media asset slots 62A and 62B provide album recommendations, five out of the nine media asset slots 62A-62I provide playlist recommendations.

Figure 11:
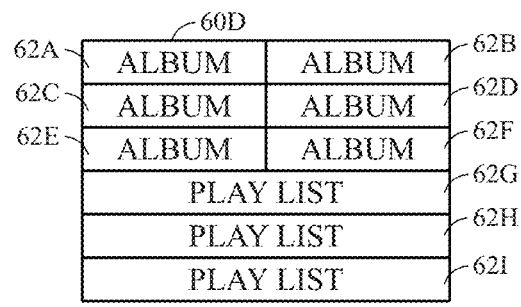
FIG. 11 depicts an example of a fourth presentation template.

Of course, the opposite may be true, as there may be some users that the recommendation service determines tend to prefer albums more than playlists. Hence, an "album intensive" presentation template may be provided in which album recommendations are provided to the user before playlist recommendations, or where the user is provided with more album recommendations than playlist recommendations. An example of one such album intensive presentation template is illustrated in FIG. 11 as presentation template 60D. In this example, the first six media asset slots 62A-62F provide the user with album recommendations, while the three media asset slots 62G-62I provide the user with playlist recommendations.

Figure 12:
FIG. 12 depicts an example of a fifth presentation template.

Other types of presentation templates 60 may also be provided in an effort to best suit the needs of certain users. For example, it has been determined that some people that prefer listening to classical music prefer works by certain composers or certain symphonies, in addition to albums or playlists by certain artists. Accordingly, a presentation template 60 that may be selected for a classical music listener may include media asset slots 62 that are designated for works by composers and/or symphonies. One such example of a classical music presentation template is illustrated in FIG. 12 as presentation template 60E. In this example, the first three media asset slots 62A-62C present the user with playlist recommendations, while the fourth, fifth and ninth media asset slots 62D, 62E and 62I are designated to present the user with recommendations by certain composers. It should also be appreciated that the classical music recommendations assigned to the media asset slots 62 could be organized by works instead of albums, by movements instead of tracks, etc.

Figure 13:
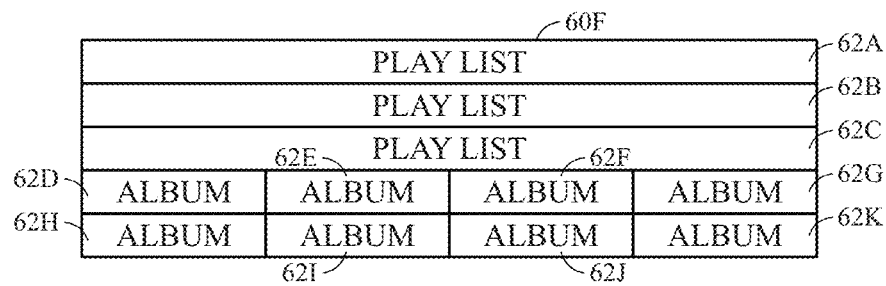
FIG. 13 depicts an example of a sixth presentation template.

In the examples of the presentation templates 60A-60E described above, each presentation template 60A-60E is defined to include nine media asset slots 62A-62I. However, presentation templates 60 may include fewer or more media asset slots 62 depending upon the manner in which it is desired to present recommendations to a user and, to some extent, depending upon the type of device and/or display that the GUI is intended to be displayed upon. For example, as illustrated in FIG. 13, the presentation template 60F includes eleven media asset slots 62A-62K, where the first three media asset slots 62A-62C are designated to display playlists to the user and where the final eight media asset slots 62D-62K are designated to display rows of four albums each to a user. Because the GUI associated with the presentation template 60F includes two rows of four albums each, the display 18 on which this GUI would be provided would likely need to be relatively large if it is desired that the user be able to view all four albums in a row at the same time. For example, the albums might not be easily viewable on a small display associated with a wearable device 30E or even a Smartphone 30B, while they would likely be much easier to discern on a display associated with a tablet device 30C or stand alone device 30D. Of course, it should be appreciated that the same presentation template 60 may be used to generate GUIs for different devices, display sizes, aspect ratios, etc.

However, it should be understood and appreciated that the GUIs associated with the presentation templates 60 may not necessarily be sized to fit on a display in their entirety. Rather, they may be sized so that the media content associated with the first media asset slot or first few media asset slots 62 may be immediately viewable to the user, but the user may need to scroll down to view the media content associated with the remaining media asset slots 62. Similarly, in the example illustrated in FIG. 13, the resulting GUI may be sized so that the user can view the media content associated with the first or the first two media asset slots 62D and 62E, but the user may need to swipe right to view the media content associated with the media asset slots 62F and 62G. Further, any given presentation template 60 may have layout variants based on display and/or device type, as well as display orientation, so that the resulting generated GUI looks good in all cases.

Figure 14:
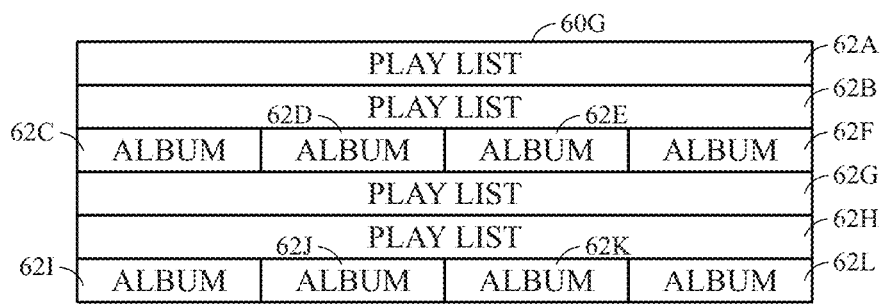
FIG. 14 depicts an example of a seventh presentation template.
Figure 15:
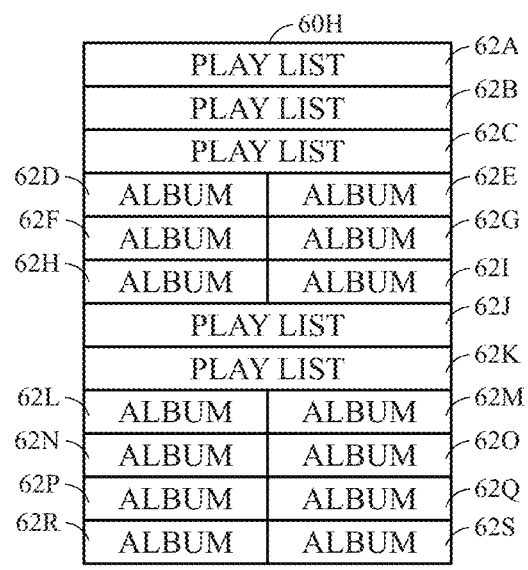
FIG. 15 depicts an example of an eighth presentation template.

Although not intended to be all-inclusive or limiting in any manner, FIGS. 14 and 15 illustrate further examples of presentation templates 60G and 60H. In the example illustrated in FIG. 14, the presentation template 60G includes twelve media asset slots 62A-62L. Media asset slots 62A-62L are arranged to provide two playlist recommendations, then four album recommendations, followed by two further playlist recommendations and four further album recommendations. In the example illustrated in FIG. 15, the presentation template 60H includes nineteen media asset slots 62A-62S. The media asset slots 62A-62S are arranged so that the user is provided with three playlist recommendations followed by six album recommendations, then two further playlist recommendations followed by eight further album recommendations.

In addition to, or alternatively to, determining the order and manner in which recommendations may be provided to a user, the presentation templates 60 may further specify the type of media content that is provided to the user. For example, if the recommendation system determines that a particular user is more inclined to listen to playlists as opposed to albums, it may select the presentation template 60B illustrated in FIG. 9. However, the selection of the recommended media content associated with each of the media asset slots 62A-62I may be chosen based on a wide variety of factors that may be found in the user's recommendation data, such as the user's taste profile, the user's history, the time of day, day of the week, weather, location, and activity, among others. The recommendation system, based at least in part on this type of user recommendation data, may determine that the user is most likely to be interested in something from a known artist or, alternatively, most likely to be interested in further discovering music from a less familiar artist. Furthermore, if the user's recommendation data indicates that the user is at home on a rainy day, the media asset slots 62 may be associated with more downbeat recommendations. Alternatively, if the user's recommendation data indicates that the user is engaging in an activity, such as jogging, a presentation template 60 having media asset slots 62 associated with more upbeat recommendations may be selected.

To follow through with some of these examples more specifically, FIG. 16 illustrates a default presentation template $60B_1$ in which the first choice to associate with the media asset slot 62A-62I is depicted in column I. In this example, the recommendation system attempts to find a multi-artist playlist to recommend in media slot 62A, a single artist playlist to recommend in media slot 62B, and any playlist to recommend in media asset slot 62C. As can be seen, if either a suitable multi-artist playlist or single artist playlist is not found for the media asset slot 62A or 62B, then the recommendation system defaults to recommending any playlist for the media asset slot 62A and 62B, as depicted in column II. Similarly, if possible, the recommendation system will first recommend two albums by known artists followed by two albums by familiar artists, and then two albums by recommended artists in media asset slots 62D-62I, respectively, as set forth in column I. If it is not possible to make any of these preferred selections, then the recommendation system attempts to make first alternative selections as set forth in column II for the media asset slots 62D-62I. If any of these selections are unable to be made, then the recommendation system makes a default or second alternative selection and selects any album for the media asset slots 62D-62I as set forth in column III. Furthermore, the media asset slots 62 may include further restrictions. For example, the media asset slot 62E might require "an album of the same genre as the album in media asset slot 62D" or the media asset slot 62G might require "an album of the same era/decade as the album in media asset slot 62F."

It is recognized that terms such as a "known artist," a "familiar artist," and a "recommended artist" are not necessarily terms that are well defined in the art. Generally speaking, however, for the purposes of this disclosure, something that is deemed to be "known" to a user, whether it be an artist, song, etc., is something that, based on the user's history, there is a high likelihood the user knows. For example, if the user has listened to the Bohemian Rhapsody by Queen over 100 times, it can be assumed that the user knows both the artist, Queen, and knows the songs on that album. Conversely, something that is deemed to be "unknown" to a user, whether it be an artist, song, etc., is something that, based on the user's history, the user has never listened to, rarely listened to, or repeatedly skipped. Furthermore, the overall popularity of the artist or song can be taken into account to determine whether it is likely unknown to the user. For example, if the recommendation system had recommended the song "Bodies" by the artist Drowning Pool to the user over one year ago, and the user skipped it within its first few seconds of play, the recommendation system can assume that this song and the artist is relatively unknown to the user.

Indeed, the recommendation system may assign probability scores to each song and/or artist related to how familiar a particular user may be with them. For example, on a scale from 0 to 1, if a song or artist is above a certain threshold (such as 0.6 or 0.7), then the recommendation engine may determine that such a song or artist is known by the user. Similarly, if a song or artist scores below a certain threshold (such as 0.3 or 0.2), then the recommendation engine may determine that the song or artist is unknown to the user.

Of course, other types of designations probably fall somewhere between known and unknown on the spectrum. For example, something that is designated as being "familiar" to the user is probably something that the user has had some exposure to, i.e., more than something that is unknown, but also something that the user has not had a substantial exposure to, i.e., less than something that is known. Accordingly, something that is familiar, such as an artist, song, etc., may fall somewhere between the known threshold and the unknown threshold. For example, songs that the user may have listened to a few times, one-hit wonders, songs that have spent a short amount of time on the Billboard Top 40 list, less popular songs by known artists, and the like, are examples of songs and/or artists that a user may have some degree of familiarity, but not likely enough familiarity to be "known."

With these understandings in mind, as mentioned previously, the recommendation system may determine, based on the user's history for example, that a user is more likely to be interested in a somewhat different or new song or artist, as opposed to something that is deemed to be known. Accordingly, rather than selecting the template $60B_1$, the recommendation system may select a discovery template $60B_2$, as illustrated in FIG. 17. It should be noticed that the first three media asset slots 62A-62C have their media content determined in the same way as the default presentation template $60B_1$. However, instead of providing album recommendations by known artists first, the discovery presentation template $60B_2$ first provides an album by a familiar artist and an album by a recommended artist in the media asset slots 62D and 62E, before providing recommendations of albums by known artists in media asset slots 62F and 62G, followed by additional albums by recommended artists in media asset slots 62H and 62I. Furthermore, if the preferred recommendations listed in column I are not available, the alternative recommendations listed in column II are either by recommended or familiar artists, rather than known artists, to provide the user with even more options to discover songs and/or artists that the user may like.

As another illustration of one of the examples mentioned above, FIG. 18 illustrates an example of a rainy day presentation template $60B_3$. Again, if the recommendation system determines that a user may be interested in listening to downbeat music, such as might be appropriate on a rainy day, it may select to associate with the presentation template 60B with media content such as illustrated in the rainy day presentation template $60B_3$. Such a determination may be made by looking at various factors, such as the user's current location, time of day, current weather conditions, the user's history, etc. For example, if the user's recommendation data indicates that the user is at home in the afternoon on a rainy day, the recommendation system may select the rainy day presentation template $60B_3$. As shown in the preferred selections of column I, the first three media asset slots 62A-62C may contain recommendations for a top new chart playlist, a featured artist playlist, and any playlist, respectively. As the name implies, the top new chart playlist will likely contain a number of songs that are listed on a top music chart, such as the Billboard Top 40, the Billboard Hot 100, the GAC Top 20 Country Songs, iTunes Top 100, etc, depending upon the genre or genres that the recommendation system determines that the user may prefer. The featured artist playlist may be a relatively new playlist or a playlist that has been selected by an editorial team of the subscription service. Following the first three playlists, the rainy day presentation template $60B_3$ provides recommendations for two downbeat albums in media asset slot 62D and 62E. Downbeat albums may be selected by an editorial team, by comparing the albums to albums typically selected by a particular user, by using audio analysis, by looking at the user's previous rainy day selections, by looking at what other users selected on rainy days, etc. Following the recommendation of the downbeat albums, a recently released album, an album by a recommended artist, another recently released album, and an album by a known artist may be recommended by media asset slots 62F-62I, respectively. As described above, if any of the preferred media content selections are not available, alternative media content selections may be made in accordance with the types of media content listed in columns II and III.

It should be understood that each type of presentation template 60A-60H may have one or more types of recommended media content for the media asset slot 62, such as the default, discovery, and rainy day templates described above. For example, FIG. 19 illustrates an example of recommended media content for the media asset slots 62A-62I of a playlist intensive presentation template, similar to the presentation template 60C illustrated in FIG. 10. In this example, the playlist intensive presentation template $60C_1$ provides a user with five consecutive playlist recommendations in the first five media asset slots 62A-62E, followed by four album recommendations in the media asset slots 62F-62I. In this particularly example, the first recommendation is a top genre playlist in the first media asset slot 62A. For example, such a playlist may be selected from amongst a number of more popular playlists associated with the user's preferred genre, such as alternative rock, classic rock, country, hip-hop, etc. The following recommended playlists, include a mixed artist playlist, a single artist playlist, a top new chart playlist, and another mixed artist playlist, in the media asset slots 62B-62E, respectively. The album recommendations include albums by known artists in media asset slots 62F and 62G, and albums by recommended artists in media asset slots 62H and 62I. Again, as described above, if any of the preferred selections in column I are not available, alternative types of media content are listed in columns II and III.

As mentioned previously, certain types of users, such as those that primarily listen to classical music, may benefit from presentation templates that provide not only recommendations based on artists, but also recommendations based on composers and/or symphonies. One example of recommended media content for the presentation template 60E of FIG. 12 is illustrated by the classical music presentation template 60E1 shown in FIG. 20. In this example, three types of playlists are recommended in media asset slots 62A-62C. Following the playlist recommendations, an album by a known composer and an album by a recommended composer are recommended in media asset slots 62D and 62E. For example, if a user often listens to Bach, an album by an artist or a symphony playing selections by Bach may be recommended in media slot asset slot 62D. However, in media asset slot 62E, an album featuring a composer in the same period and general style, such as Handel, Telemann, Corelli, or Vivaldi, may be recommended. The following media asset slots 62G, 62H, and 62I contain recommendations for an album by a familiar artist, an album by a recommended artist, and an album by a known composer, respectively. If any of the preferred recommended media content in column I are not available, the recommended media content in columns II or III may be selected.

The basic technique by which the recommendation system embodied in the cloud computing system 50 may choose the appropriate template and make the appropriate recommendation for a user is illustrated in the flowchart 70 shown in FIG. 21. The recommendation system obtains or accesses a user's recommendation data (block 72). As discussed previously, a user's recommendation data may contain a wide variety of information, such as a user's taste profile that may be determined based on what a user has previously purchased, what a user has previously listened to, what is in a user's library, and include, among other things, the type of media content the user tends to select, such as singles, albums, playlists, music videos, etc., as well as preferred genres, tendencies towards known artists or new artists, etc. The user's recommendation data may also include other types of information relevant to the user, such as time of day, day of the week, current weather conditions, the user's current location (e.g., user's work, the user's home, another's home, a park, or a beach), and an indication of the user's activity (e.g., working out at the gym, walking, driving, jogging, etc.).

Once the user's recommendation data is accessed or obtained, the recommendation system can use such data, at least in part, to choose an appropriate presentation template from a plurality of presentation templates 60 (block 74). For example, if the recommendation system determines that the user tends to prefer playlists over albums and new artists over familiar artists, it may choose the presentation template 60B and, more specifically, the discover presentation template $60B_2$. On the other hand, if the recommendation system determines that the user tends to prefer playlists over albums and prefers classical music, the recommendation system may choose presentation template 60E and, more specifically, the presentation template $60E_1$.

Once the appropriate presentation template has been chosen, the recommendation system selects the content for each of the media asset slots 62 in the chosen presentation template 60 (block 76). For example, as discussed above, if the classical music presentation template $60E_1$ is chosen, the recommendation system will attempt to associate the first media asset slot 62A with a multi artist playlist. However, if no multi artist playlist is found to be appropriate for the particular user, it will then associate the first media asset slot 62A with any playlist. The remaining media asset slots 62B-62I will similarly be associated based on the preferences set forth in column I of FIG. 20 or the respective backup selections set forth in columns II and III of FIG. 20.

After the recommended media content has been selected for each of the media asset slots 62 in the selected presentation template 60, the recommendation system may utilize the presentation template 60 to generate a GUI and send it from the cloud computing service 50 to the appropriate device 30, such as one of the devices 30A-30E. Alternatively, the recommendation system may send the data corresponding to the presentation template 60 from the cloud computing service 50 to the appropriate device 30, and the device 30 may use that data to generate the appropriate GUI. Although any suitable technique may be used to generate an appropriate GUI using the presentation template 60, one technique uses the presentation template 60 as a model, and uses code to generate a Document Object Model in a markup language. This is then parsed by native code to render the GUI. This may take place in the cloud service 50 or on the devices 30.

Once one of the electronic devices 30 has the GUI, it may display the recommended media content to the user. Again, as discussed above, depending upon the presentation template 60 and the electronic device 30, the GUI may fit entirely on the display 18 of the electronic device 30 so that the user can see all of the recommendations at once, or the user may need to scroll up, down, left, or right to view all of the recommendations. It should be understood that any of the recommendations may be selected by the user, by tapping the selected recommendation for instance, so that the user may interactively view the songs in the selected album or playlist, select and play certain songs, purchase certain songs, albums, or playlists, etc. For example, if a user selects a recommended playlist on the GUI, the album covers of the songs on the playlist may be presented to the user in a coverflow arrangement, so that the user could flip through the songs and either select or preview a song. As another example, a user could "long press" a recommended item on the GUI to cause the device to play a preview of each song associated with the selected item.

Although the above discussion of the flowchart 70 has been primarily directed to the recommendation service on the cloud service 50 performing most of the tasks, an electronic device 30 may perform many of these tasks instead. For example, an electronic device 30 may receive media content from the recommendation service of cloud computing service 50. The electronic device 30 may store one or more of the presentation templates 60 and choose a presentation template from the plurality of presentation templates based at least in part on the received media content. The electronic device 30 may then associate the respective media asset slots 62 of the chosen presentation template 60 with the received media content. Once all of the media asset slots 62 of the chosen presentation template 60 have been associated with the recommended media content, the electronic device 30 may use it to generate a GUI for its display 18.

Figure 22:
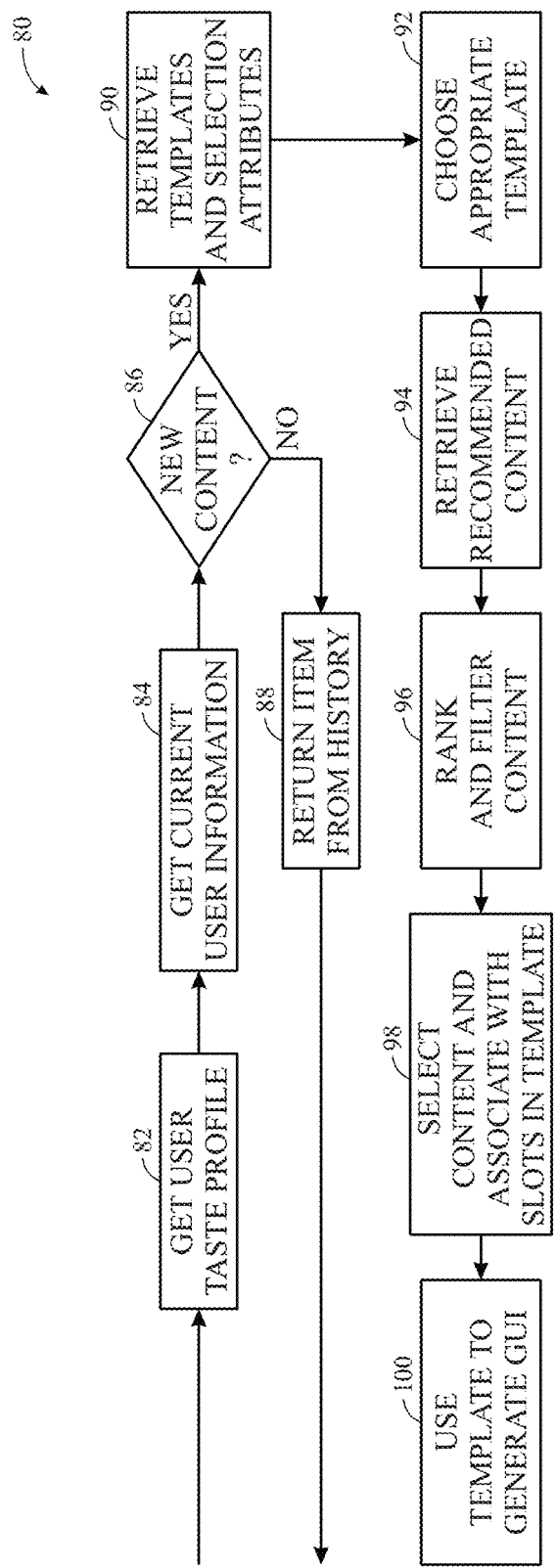
FIG. 22 is a flowchart illustrating a specific example of the technique illustrated in FIG. 21.
Figure 23:
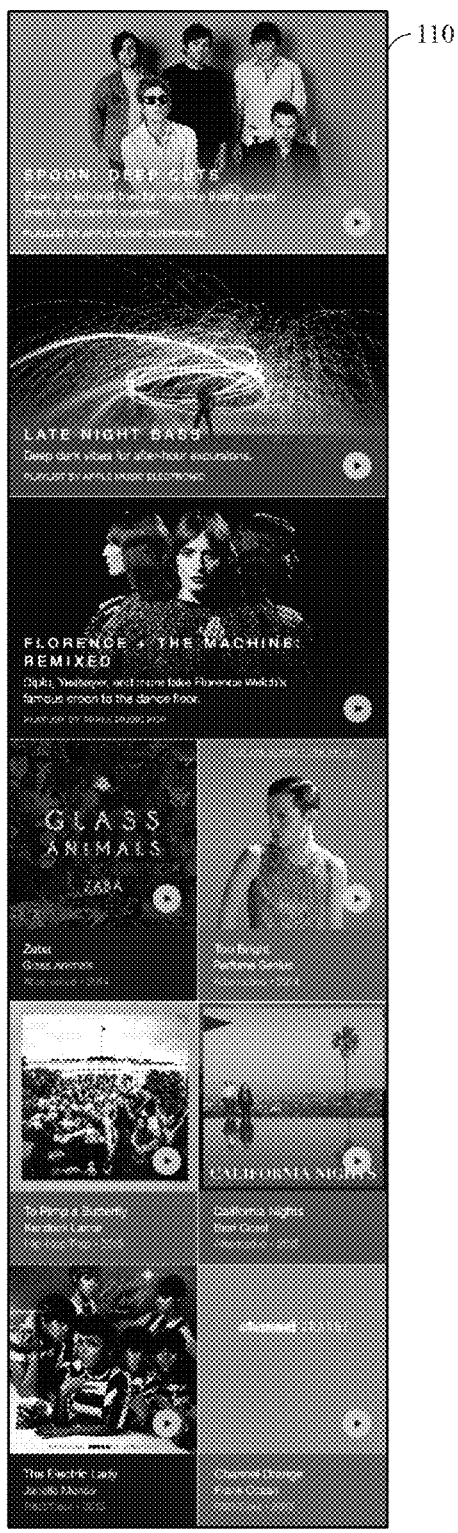
FIG. 23 illustrates an example of a graphical user interface generated utilizing the discovery presentation template of FIG. 17.
Figure 24:
FIG. 24 illustrates an example of a graphical user interface generated utilizing the classical music presentation template of FIG. 20.

Although the general technique for using presentation templates to facilitate the selection and presentation of recommended media content is described above with reference to the flowchart 70, it should be appreciated that such a technique may be executed in various ways. One more specific way to execute the technique is illustrated by the flowchart 80 shown in FIG. 22. In this technique, the recommendation system embodied in the cloud computing service 50 obtains or accesses the user's taste profile (block 82). As discussed above, the user's taste profile may be built using a variety of different data, including what the user has previously purchased, what the user has previously listened to, what is in the user's library, preferred genres, preferred types of media, etc. The recommendation system also obtains current user information (block 84). Again, as discussed above, such information may include a variety of data, such as the time of day, the day of the week, the user's location, the weather conditions where the user is located, the type of activity that the user is engage in, etc. The recommendation system may then determine whether it is desirable to provide any new content to the user (block 86). If not, the recommendation system selects and returns an item from the user's history as the recommended media content.

However, if the recommendation service determines that providing the user with new content is desirable, it retrieves or accesses the plurality of stored presentation templates 60 along with their selection attributes, e.g., the presentation templates 60 described above with regard to FIGS. 8-20 (block 90). Based at least in part on the user's taste profile and the user's current information, the recommendation system chooses the appropriate presentation template 60 (block 92). Once the appropriate presentation template 60 and selection attributes have been selected, the recommendation system retrieves recommended media content for the user and ranks and filters such content (blocks 94 and 96). Based on the presentation template 60, the selection attributes, and the ranked and filtered media content, the recommendation system selects appropriate media content to associate with the particular media asset slots 62 in the chosen presentation template 60 (block 98). Once all of the media asset slots 62 of the presentation template 60 have been associated with the appropriate media content, the recommendation system may utilize the presentation template to generate a GUI and send it to the appropriate electronic device 30 for display to the user, or the recommendation system may send the data corresponding to the presentation template 60 from the cloud computing service 50 to the appropriate device 30, and the device 30 may use that data to generate the appropriate GUI.

Figure 25:
FIG. 25 illustrates an example of a graphical user interface generated utilizing the presentation template of FIG. 13.
Figure 26:
FIG. 26 illustrates an example of a graphical user interface generated utilizing the presentation template of FIG. 14.

Several examples of the types of GUIs that may be produced by the recommendation system using the presentation templates 60 are illustrated in FIGS. 23-26. For example, the GUI 110 illustrated in FIG. 23 may provide recommended media content corresponding to the discovery presentation template $60B_2$ illustrated in FIG. 17. As another example, the GUI 112 illustrated in FIG. 23 may provide recommended media content corresponding to the classical music presentation template $60E_1$ illustrated in FIG. 20. The GUI 114 illustrated in FIG. 25 provides recommended media content that generally corresponds to the presentation template 60F illustrated in FIG. 13. It should be noted that only three of the four recommended albums are illustrated in the fourth and fifth of the GUI 114, but the user may access the fourth recommended album in each row by swiping left or right. Finally, the GUI 116 illustrated in FIG. 26 provides recommended media content that generally corresponds to the presentation template 60G illustrated in FIG. 14. It should be noted that the GUI 116 illustrates all four recommended album selections, which suggests that this GUI 116 may be sized for a larger display.

The present disclosure recognizes that the use of personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for certain services. In another example, users can select not to provide location information for targeted content delivery services. In yet another example, users can select to not provide precise location information, but permit the transfer of location zone information.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for recommending media content comprising:

obtaining a user's recommendation data including current user information associated with a current time and historical user information associated with user activity prior to the current time;

selecting a first presentation template from a plurality of predefined presentation templates that are available to the user based at least in part on the user's recommendation data, wherein each of the plurality of predefined presentation templates defines a respective presentation order for a plurality of media asset slots, and wherein at least one of the plurality of media asset slots is associated with a respective plurality of selection attributes including a primary selection attribute and one or more backup selection attributes different from the primary selection attribute; and associating the plurality of media asset slots with a respective plurality of sets of playable media content based at least in part on the user's recommendation data and selection attributes for each of the plurality of media asset slots, wherein, in response to a determination that no set of playable media content having a corresponding primary selection attribute is available, at least one of the plurality of media asset slots is associated with a set of playable media content having a corresponding backup selection attribute, wherein the first presentation template defines a first presentation order in which the recommendations are presented to a user when the first presentation template is utilized to generate a graphical user interface allowing selection of the recommendations to initiate playback of selected ones of the sets of playable media content.

2. The method of claim 1, wherein the historical user information includes a taste profile for the user.

3. The method of claim 2, wherein the taste profile is based on previously purchased media content, previously listened to media content, listing of media content in the user's library, or type of media content, or any combination thereof.

4. The method of claim 3, wherein the type of media content comprises audio singles, audio albums, audio playlists, or music videos, or any combination thereof.

5. The method of claim 1 wherein the current user information includes a current time of day, a current day of week, a current location of the user, a current weather at the current location of the user, or a current activity of the user, or any combination thereof.

6. The method of claim 1 wherein the current user information includes an indication that the user is currently the current user activity comprises working out at a gym, walking, jogging, bicycling, or driving.

7. The method, as set forth in claim 1, wherein selecting the first presentation template comprises:
accessing the plurality of predefined presentation templates, wherein each of the media asset slots of each respective presentation template is related to a respective type of playable media content; and
selecting the first presentation template from the plurality of predefined presentation templates.

8. The method, as set forth in claim 7, wherein the plurality of predefined presentation templates comprises:
a default presentation template, a discovery presentation template, a rainy day presentation template, a playlist intensive presentation template, or a classical music presentation template, or any combination thereof.

9. The method, as set forth in claim 8, wherein the default presentation template comprises media asset slots for known artists, media asset slots for familiar artists, and media asset slots for recommended artists, wherein the media asset slots for known artists are before the media asset slots for familiar artists, and wherein the media asset slots for familiar artists are before the media asset slots for recommended artists.

10. The method, as set forth in claim 9, wherein the default presentation template comprises media asset slots for playlists before media asset slots for albums.

11. The method, as set forth in claim 8, wherein the discovery presentation template comprises media asset slots for familiar or recommended artists before media asset slots for known artists.

12. The method, as set forth in claim 8, wherein the rainy day presentation template comprises media asset slots for downbeat media content before media asset slots for other types of media content.

13. The method, as set forth in claim 8, wherein the playlist intensive presentation template comprises media asset slots for playlists before media slots for other types of media content.

14. The method, as set forth in claim 8, wherein the classical music presentation template comprises media asset slots for composers.

15. The method, as set forth in claim 1, wherein each media asset slot is associated with a respective type of playable media content, and wherein associating the plurality of media asset slots comprises selecting a specific playable media for each of the respective media asset slots, wherein the specific playable media for each of the respective media asset slots relates to the type of playable media content for that media asset slot.

16. The method, as set forth in claim 1, comprising:
generating the graphical user interface utilizing the presentation template;
receiving a selection of a particular recommendation; and
initiating playback of a set of media content corresponding to the particular recommendation.

17. The method, as set forth in claim 1, the plurality of predefined presentation templates also defines a type of playable media content for the plurality of media asset slots.

18. The method, as set forth in claim 17, wherein the type of playable media content corresponds to one of a playlist or an album.

19. The method, as set forth in claim 1, wherein selecting the first presentation template from the plurality of predefined presentation templates includes selecting the first presentation template from the plurality of predefined presentation templates that are available to the user based at least in part on the user's recommendation data and display attributes associated with the user's device.

20. An electronic device for displaying recommended media content comprising:
a non-transitory memory;
a processor being operatively coupled to the non-transitory memory, the processor being configured to:
obtain a user's recommendation data including current user information associated with a current time and historical user information associated with user activity prior to the current time;
select a first presentation template from a plurality of predefined presentation templates that are available to the user based at least in part on the user's recommendation data, wherein each of the plurality of predefined presentation templates defines a respective presentation order for a plurality of media asset slots, and wherein at least one of the plurality of media asset slots is associated with a respective plurality of selection attributes including a primary selection attribute and one or more backup selection attributes different from the primary selection attribute;
associate the plurality of media asset slots in the first presentation template with a respective plurality of sets of playable media content, wherein, in response to a determination that no set of playable media content having a corresponding primary selection attribute is available, at least one of the plurality of media asset slots is associated with a set of playable media content having a corresponding backup selection attribute; and
utilize the first presentation template to generate a graphical user interface allowing selection of the recommendations to initiate playback of selected ones of the set of playable media content, wherein the first presentation template defines a first presentation order in which the recommendations are presented to the user in the graphical user interface; and
a display configured to receive and display the graphical user interface.

21. The electronic device, as set forth in claim 20, wherein the plurality of predefined presentation templates comprises:

a default presentation template, a discovery presentation template, a rainy day presentation template, a playlist intensive presentation template, or a classical music presentation template, or any combination thereof.

22. The electronic device, as set forth in claim 21, wherein the default presentation template comprises media asset slots for known artists, media asset slots for familiar artists, and media asset slots for recommended artists, wherein the media asset slots for known artists are before the media asset slots for familiar artists, and wherein the media asset slots for familiar artists are before the media asset slots for recommended artists.

23. The electronic device, as set forth in claim 22, wherein the default presentation template comprises media asset slots for playlists before media asset slots for albums.

24. The electronic device, as set forth in claim 21, wherein the discovery presentation template comprises media asset slots for familiar or recommended artists before media asset slots for known artists.

25. The electronic device, as set forth in claim 21, wherein the rainy day presentation template comprises media asset slots for downbeat media content before media asset slots for other types of media content.

26. The electronic device, as set forth in claim 21, wherein the playlist intensive presentation template comprises media asset slots for playlists before media slots for other types of media content.

27. The electronic device, as set forth in claim 21, wherein the classical music presentation template comprises media asset slots for works by composers.

28. A non-transitory computer-readable medium, which, when executed by one or more processors of an electronic device cause the electronic device to:
  obtain a user's recommendation data including current user information associated with a current time and historical user information associated with user activity prior to the current time;
  select a first presentation template from a plurality of predefined presentation templates that are available to the user based at least in part on the user's recommendation data, wherein each of the plurality of predefined presentation templates defines a respective presentation order for a plurality of media asset slots, and wherein at least one of the plurality of media asset slots is associated with a respective plurality of selection attributes including a primary selection attribute and one or more backup selection attributes different from the primary selection attribute; and
  associate the plurality of media asset slots with a respective plurality of sets of playable media content based at least in part on the user's recommendation data and selection attributes for each of the plurality of media asset slots, wherein, in response to a determination that no set of playable media content having a corresponding primary selection attribute is available, at least one of the plurality of media asset slots is associated with a set of playable media content having a corresponding backup selection attribute, wherein the first presentation template defines a first presentation order in which the recommendations are presented to a user when the first presentation template is utilized to generate a graphical user interface allowing selection of the recommendations to initiate playback of selected ones of the set of playable media content.

29. The non-transitory computer-readable medium, as set forth in claim 28, wherein the plurality of predefined presentation templates comprises:
  a default presentation template, a discovery presentation template, a rainy day presentation template, a playlist intensive presentation template, or a classical music presentation template, or any combination thereof.

30. The non-transitory computer-readable medium, as set forth in claim 29, wherein the default presentation template comprises media asset slots for known artists, media asset slots for familiar artists, and media asset slots for recommended artists, wherein the media asset slots for known artists are before the media asset slots for familiar artists, and wherein the media asset slots for familiar artists are before the media asset slots for recommended artists.

31. The non-transitory computer-readable medium, as set forth in claim 29, wherein the default presentation template comprises media asset slots for playlists before media asset slots for albums.

32. The non-transitory computer-readable medium, as set forth in claim 29, wherein the discovery presentation template comprises media asset slots for familiar or recommended artists before media asset slots for known artists.

33. The non-transitory computer-readable medium, as set forth in claim 29, wherein the rainy day presentation template comprises media asset slots for downbeat media content before media asset slots for other types of media content.

34. The non-transitory computer-readable medium, as set forth in claim 29, wherein the playlist intensive presentation template comprises media asset slots for playlists before media slots for other types of media content.

35. The non-transitory computer-readable medium, as set forth in claim 29, wherein the classical music presentation template comprises media asset slots for works by composers.

* * * * *